United States Patent [19]
Maruyama et al.

[11] Patent Number: 5,640,575
[45] Date of Patent: Jun. 17, 1997

[54] METHOD AND APPARATUS OF TRANSLATION BASED ON PATTERNS

[75] Inventors: Hiroshi Maruyama, Tokyo; Koichi Takeda, Machida, both of Japan

[73] Assignee: International Business Machines Corporation, Armonk, N.Y.

[21] Appl. No.: 326,050

[22] Filed: Oct. 19, 1994

Related U.S. Application Data

[63] Continuation of Ser. No. 35,818, Mar. 23, 1993, abandoned.

[30] Foreign Application Priority Data

Mar. 23, 1992 [JP] Japan .................................. 4-064552

[51] Int. Cl.$^6$ .................................................. G06F 17/28
[52] U.S. Cl. ..................... 395/754; 395/752; 395/755
[58] Field of Search ........................ 364/419.02, 419.04, 364/419.05; 395/754, 755, 752

[56] References Cited

U.S. PATENT DOCUMENTS

| | | | |
|---|---|---|---|
| 4,464,731 | 8/1984 | Nishimura | 364/419.07 |
| 4,502,128 | 2/1985 | Okajima et al. | 364/419 |
| 4,599,691 | 7/1986 | Sakaki et al. | 364/419 |
| 4,744,050 | 5/1988 | Hirosawa et al. | 364/419 |
| 4,775,956 | 10/1988 | Kaji et al. | 364/419.07 |
| 4,796,185 | 1/1989 | Yoshimura et al. | 364/419.13 |
| 4,959,785 | 9/1990 | Yamamoto et al. | 364/419.12 |
| 5,101,424 | 3/1992 | Clayton et al. | 379/10 |
| 5,357,430 | 10/1994 | Rackow et al. | 364/419.08 |
| 5,383,121 | 1/1995 | Letkeman | 364/419.11 |

FOREIGN PATENT DOCUMENTS 57-83961  3/1984  Japan .

OTHER PUBLICATIONS

*Database and Data Communications Systems: A Guide for Managers*, Reston Pub. Co., 1983, Walsh, pp. 123–127.

*Patent Abstracts of Japan*, vol. 14, No. 333, Apr. 24, 1990, Abstract No. 02–112 065, Nakajima et al.

*Patent Abstracts of Japan*, vol. 14, No. 185, Feb. 2, 1990, Abstract No. 02–32467, Yoshinaka et al.

*Turbo C: Programming for the PC*, SAMS Pub. Co., 1989, Lafore, pp. 300–302 *Data Structures and Algorithms: Sorting & Searching*, Springer–Verlag, 1984, Mehlhorn, pp. 104–105.

*Primary Examiner*—Robert A. Weinhardt
*Assistant Examiner*—Joseph Thomas
*Attorney, Agent, or Firm*—Perman & Green

[57] ABSTRACT

A device which translates a written source language pattern of a first language to a target language pattern of another written language, which includes a computer with a memory. There are a plurality of translation patterns stored in the memory. Each translation pattern includes a source language pattern; a variable that is identified with a portion of the source language pattern; and a target language pattern which is a translation corresponding to the base source language pattern. The variable is either a singular variable which corresponds to a singular source language pattern, or a nested variable which corresponds to a nested source language pattern. Each nested source language pattern is a combination of two or more singular source language patterns. A portion compares a text sentences to one or more nested source language patterns and singular source language pattern to determine if there is a match between the text sentence and the nested or the singular source language patterns.

10 Claims, 13 Drawing Sheets

FIG. 4A

| ADDRESS | CHARACTER | ATTRIBUTE | CONTINUITY | NUMBER OF BRANCHES | BRANCH ADDRESS |
|---|---|---|---|---|---|
| 211A | ～ | 変数 | 継続 | 3 | は(212A), を(212B), ... |
| ... | ... | ... | ... | ... | ... |
| 211C | % | 変数 | 継続 | 3 | ... ... ... ... |
| ... | ... | ... | ... | ... | ... |
| 211N | 特 | 定数 | 継続 | 4 | 許(212N), ... ... ... |
| ... | ... | ... | ... | ... | ... |
| 212A | は | 定数 | 継続 | 2 | ～(213A), ... ... ... |
| 212B | を | 定数 | 継続 | 4 | ～(213B), ... ... ... |
| ... | ... | ... | ... | ... | ... |
| 212N | 許 | 定数 | 終了, (～), 222L | 5 | 出(213N), ... ... ... |
| ... | ... | ... | ... | ... | ... |

13

| ADDRESS | TARGET LANGUAGE PATTERN |
|---|---|
| 221A | $1 IS $2. |
| 22B | $2 $1. |
| 221C | IMPROVE $1 IN PRODUCTIVITY. |
| 221D | $1 ARE $2. |
| ⋮ | ⋮ |
| 222L | PATENT |
| 222M | PATENT APPLICATION |
| 222N | FILE FOR PATENT APPLICATION |
| ⋮ | ⋮ |

FIG. 4B

| SOURCE LANGUAGE PATTERN | VARIABLE | TARGET LANGUAGE PATTERN | |
|---|---|---|---|
| ～を～する | ? | $2$1. | ←181 |
| ～を改良する | ? | IMPROVE $1 IN PRODUCTIVITY. | ←182 |
| 改良 | ? | IMPROVEMENT | ←183 |
| 改良する | ? | IMPROVE IN PRODUCTIVITY | ←184 |
| 接点 | ? | POINT OF CONTACT | ←185 |
| 接続 | ? | CONNECTION | ←186 |

FIG. 6

| SOURCE LANGUAGE PATTERN | VARIABLE | TARGET LANGUAGE PATTERN |
|---|---|---|
| ####-### | @ | P/N$1$2$3$4-$5$6$7 |
| 0 | # | 0 |
| 1 | # | 1 |
| 2 | # | 2 |
| 3 | # | 3 |
| 4 | # | 4 |
| 5 | # | 5 |
| 6 | # | 6 |
| 7 | # | 7 |
| 8 | # | 8 |
| 9 | # | 9 |

FIG. 12    18

| SOURCE LANGUAGE PATTERN | VARIABLE | TARGET LANGUAGE PATTERN |
|---|---|---|
| COPY ~ TO ~ | # | COPYFILE $1 $2 |
| DELETE~ | # | DEL $1 |
| INSERT ~ TO ~ | # | APPEND $1 $2 |
| @ % | ~ | $1.$2 |
| TEXT | % | TXT |
| DATA | % | DAT |

FIG. 13    18

| SOURCE LANGUAGE PATTERN | VARIABLE | TARGET LANGUAGE PATTERN |
|---|---|---|
| Au revoir | %X | GOOD-BYE |
| merci | %X | THANK YOU |
| s'il vou% plait | %Y | PLEASE |
| de la %F ã% | ~ | FROM $1 TO $2 |
| du %M ã% | ~ | FROM $1 TO $2 |
| ~, %Y. | # | $1, $2. |
| %X, %N | # | $1, $2. |

FIG. 14

METHOD AND APPARATUS OF TRANSLATION BASED ON PATTERNS

This is a continuation of application Ser. No. 08/035,818 filed on Mar. 23, 1993 now abandoned.

BACKGROUND OF THE INVENTION

1. Field of the Invention

This invention relates to a translation system based on patterns, and more particularly to a translation system based on patterns that are suitable for use by individual users as preprocessing for a general machine translation system that is difficult to customize.

2. Description of the Prior Art

It is a matter of course that the accuracy of the translation system itself is of importance in putting machine translation to practical use. However, customization functions are no less important, since they make accommodation to the wording of an application easier.

In current machine translation technology, customization is mainly performed by additions to and changes in the terms in a dictionary and tuning of grammatical rules. However, a high level knowledge of linguistics and the system is required to modify the dictionary and the grammatical rules while maintaining the integrity of the entire system. In addition, if expressions unique to the customer do not fit the language model of the system, it is sometimes very difficult to add such expressions. Therefore, the case of customization is a key factor in putting machine translation into practical use. For example, customization may be required to translate some Japanese characters that have a pronunciation but not independent meaning in English. Only when these characters are combined with more than two characters do they represent a specific meaning.

One method to solve such problems in which the user prepares in advance translation sentence patterns unique to him or her, and in which translation sentences are generated by collating these patterns as preprocessing of translation is disclosed in, for example, Published Unexamined Patent Applications 2-32467 and 3-116272. These translation sentence patterns are arranged to be able to be replaced with "numerical values" and specific terms in an original sentence as variables.

However, this method is in principle one in which the translation sentence patterns only correlate an original sentence and a translation sentence in a one-to-one relationship. To cover a wide range of expressions with this method, it is necessary to prepare a number of patterns and to take an extensive period of time for creating and retrieving the translation sentence patterns. This is not efficient.

OBJECTIVES

An object of this invention is to provide improved translation patterns which a user can easily create and retrieve.

SUMMARY OF THE INVENTION

It is intended to provide translation patterns for machine translation that can easily be created and efficiently retrieved by a user and can generate a translation sentence based on these patterns. The translation pattern has a very simple and flexible form so that even users without knowledge of linguistics and the system can add a new translation pattern without damaging the consistency of the translation system itself. In addition, the pattern matching method can efficiently work on a large amount of patterns so that the response of the entire system is not adversely affected.

A translation pattern comprises a first source language pattern, a variable that replaces this first source language pattern with one character, and a target language pattern that is a translation sentence corresponding to the first source language pattern. Alternately, the source language pattern can be nested. A nested source language pattern has one or more replacing variables, representing one or more second source language patterns, nested within the first source language pattern. A translation sentence is generated based on the result of matching between an inputted text sentence and a translation pattern. If there is no matching translation pattern, translation is performed by a general machine translation apparatus based on a grammar. Because a nested structure is employed, the user can create a number of translation patterns based on a specific method of expression, and can easily perform customization. Furthermore, fast pattern matching becomes possible by creating an index with a tree structure.

BRIEF DESCRIPTION OF THE DRAWINGS

FIG. 4a is one embodiment of a source language pattern table.

FIG. 4b is one embodiment of target language pattern table

FIG. 6 is a table showing parts in a translation pattern relating to a text sentence in the translation pattern.

FIG. 12 is a table showing an example of patterns as another embodiment according to his invention that matches part numbers.

FIG. 13 is a table showing an example of a translation table as still another embodiment according to this invention that is used for creating a computer command form natural-language-like inputs.

FIG. 14 is a table showing other example of translation table.

DETAILED DESCRIPTION OF THE INVENTION

Figure 1:
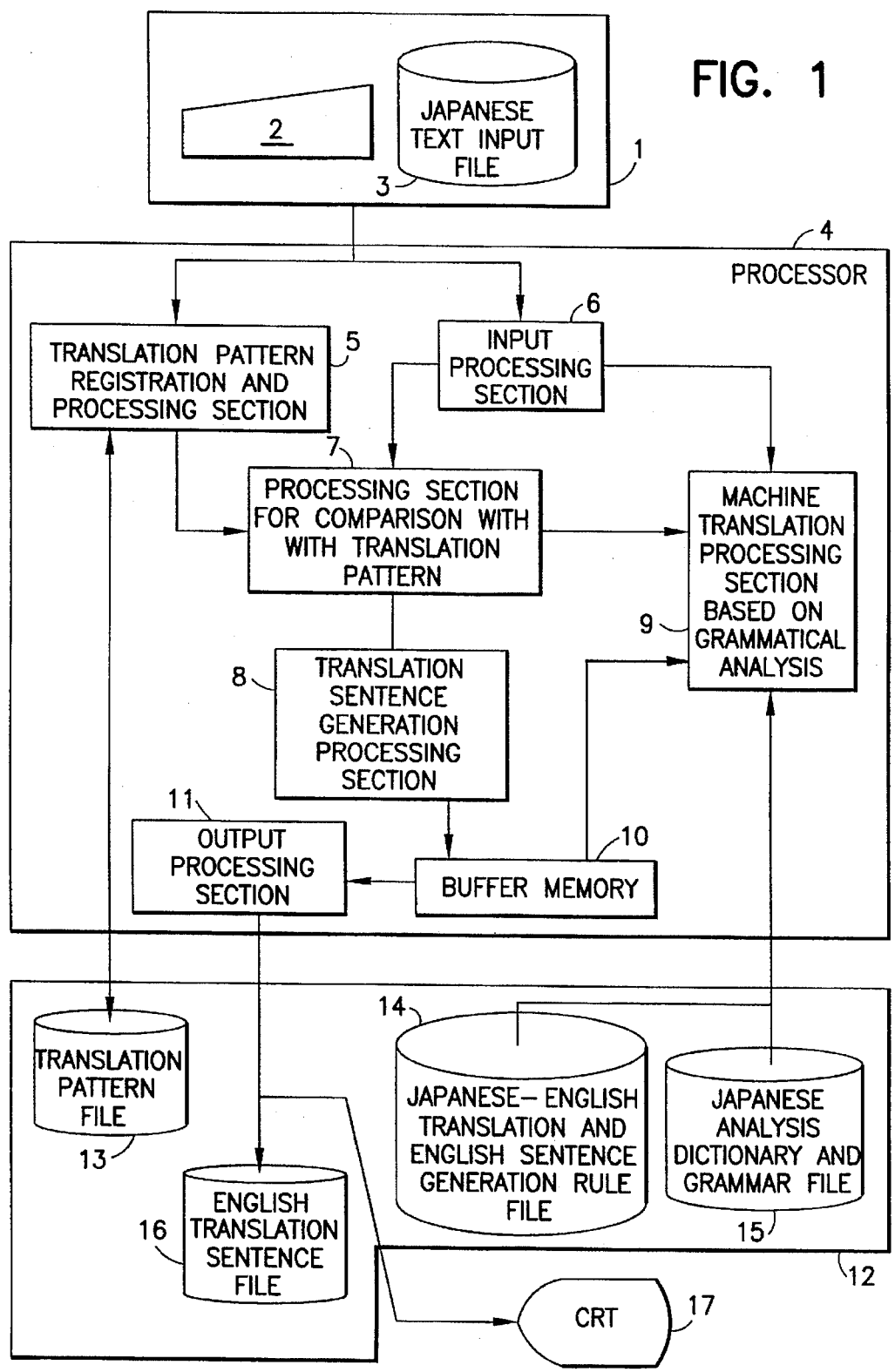
FIG. 1 is a diagram showing the configuration of an entire machine translation system as an embodiment according to this invention.

FIG. 1 is a block diagram showing a configuration of an entire machine translation system as an embodiment of this invention. An example of Japanese-English translation is described herein.

Block 1 is an input means, through which text data and various operation commands are inputted in to a processor 4 by a keyboard 2 or a Japanese text input file 3. The processor 4 has a general configuration such as an arithmetic unit, a memory and a controller to perform translation processing according to the processing procedure described later. Functionally, it has the following configuration. Block 5 is a translation pattern registration and processing section which is used by a user to generate and register a translation pattern table. Block 6 is an input processing section which sends the inputted Japanese text to a comparison processing section 7 and compares it with translation patterns in a translation pattern file 13 for matching. If they match s the result of comparison, a translated generation processing section 8 generates a translated English sentence by using the translation pattern and sends it an output processing section 11 through a buffer memory 10. If they do not match as the result of comparison, a machine translation processing section 9 performs machine translation by grammatical analysis. If required, it may be arranged to translate the Japanese text both with translation using the patterns and with the machine translation processing, to compare results, and to select the proper one.

Block 12 is an external storage which provides the translation pattern file 13 which records the above-mentioned translation pattern table, a Japanese-English translation and English sentence generation rule file 14 for the machine translation processing, as well as a Japanese analysis dictionary and a grammar file 15. Block 16 is a file which records an English sentence translated in the translated sentence processing section 8 or the machine translation processing section 9. The progress and the result of the translation processing is displayed on a display means 17.

Figure 2:
FIG. 2 shows an example of translation patterns of this invention.

FIG. 2 shows an example of a translation pattern table.

A translation pattern 18 comprises a tuple of three items <original language pattern 18A, variable 18B, target language pattern 18C>. A plurality of translation patterns comprising such sets constitutes a translation pattern group. For example, a translation pattern <特許,~,patent> indicates that the character string, "特許" is translated into the character string, "patent". In addition, it indicates that the string "特許" can be identified with the one-character variable "~" when "it" appears as part of a longer character string. The variable can be treated as one character regardless of its physical size as long s it can be distinguished from other characters. A source language pattern in 18A may contain several varieties in 18B such as "~" or "#". The first variable ~, the second variable ~ in a source language pattern of 18A, ... are replaced with variables $1, $2, ... in the corresponding target language pattern of 18C.

The source language pattern 18A may be expressed in the form of a sentence, a clause, a phrase, or a lexical category. As described later, the original language pattern 18A is characterized by the fact that it contains a sentence, a clause, or a phrase with a nested structure 19 for a variable 18B, as in "～は～である".

Such a nested structure 19 using the variable 18B is very simple and flexible, and can easily be used by a user who does not have knowledge of linguistics and the system. The user can easily register and add a new translation pattern in the translation pattern file 13 without damaging consistency with the translation system.

When compared with Japanese, one of the major features of expression in English is that a noun or verb is affected by number agreement. This can be dealt with by performing translation using a machine translation system together with an accurate grammar. However, for specific expressions that the user frequently uses, it may be acceptable to prepare translation patterns previously distinguished by number. For example, as seen in the examples of FIG. 2, nouns or verbs in the target language pattern may be altered as follows by selectively using variables "~" and "%" according to the number of claims.

claim 1 is invalid.

claims 2 and 3 are valid.

As it is conceivable that the number of translation patterns may become huge, it is important that the source language patterns can be retrieved at a rapid speed. Therefore, an index with a tree structure 20 in FIG. 3 is created for the original language patterns and is registered in the translation pattern file 13 as a part of the table of source language patterns.

Figure 3:
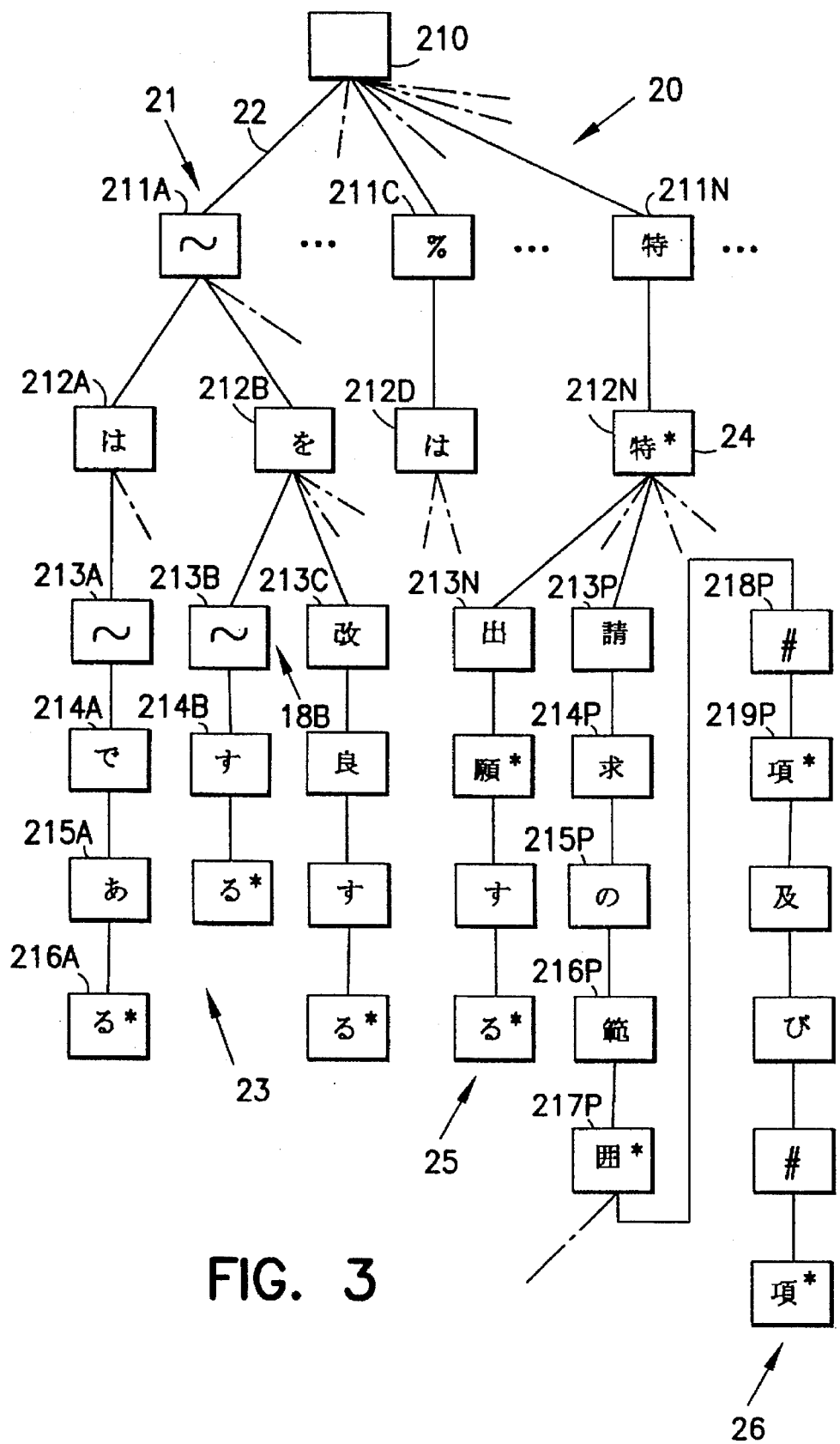
FIG. 3 is an index in a tree structure for source language patterns in the translation patterns of FIG. 2.

As shown in FIG. 3, the index is created in a form that extracts common prefixes in the source language patterns 18A such as "~" and "特許" Each of the nodes 21 (211A, 212A, ... ) of the tree structure 20 is caused to correspond to one character or variable. Therefore, it can be considered that a portion traced from the root 210 of the tree through its nodes 211A, 212A, ... corresponds to a partial pattern being matched in the source language pattern. For example, the node 212N corresponds to a matching with a partial pattern "特許". The superscript asterisk (*) of node 212N indicates that this node corresponds to the end of a full pattern. In this case, there is a source language pattern "特許".

As described, the source language patterns have the feature that they contain a sentence pattern such as 23 "～は～である" in which the variables in 18A are embedded In addition, there are partial patterns such as 24, which consist of a noun or a noun phrase such as "特許" and which constitute a part of a sentence. The partial patterns include patterns consisting of various lexical categories or phrasal categories such as a pattern 25 constituting a verb phrase "特許 出 願する". Similarly, it is possible to create patterns consisting of clauses. The partial patterns also include a pattern 26 with a nested structure containing a variable or symbol such as "#". The above-mentioned sentence pattern 23 may be further taken in as a part of another sentence pattern or partial pattern with a relative pronoun. In this manner, there are various source language patterns, and there is no limitation on either the arrangement of characters and variables constituting each pattern or the length of each pattern. It is possible to create translation patterns most suitable for the user by freely combining each pattern using various characters or variables as required.

FIG. 4 is a diagram which shows essential parts of an example of a translation pattern and comprises a source language pattern table (a) and a target language pattern table (b). The source language pattern is recorded with an index as an address, attribute, continuity, number of branches, branch addresses and the like for each character and variable in the source language pattern. The attribute includes distinction as to whether the symbol in the source language is a normal character or a variable. However, such a distinction is not necessarily required. Continuity indicates whether or not there is a separation in a source language pattern. If there is a source language pattern such as "許," that terminates with that node the variable 18B to be replaced such as "~" and a pointer (222L) to a translation sentence 18C such as "Patent" in the corresponding target language pattern table are described. There may be a plurality of translation sentences and variables to be replaced for a single source language pattern. A pointer to an index corresponding to each succeeding character or variable is described in a branch address column. The branch address may be encoded and calculated using any search method such as a has table or a binary search method.

Figure 5:
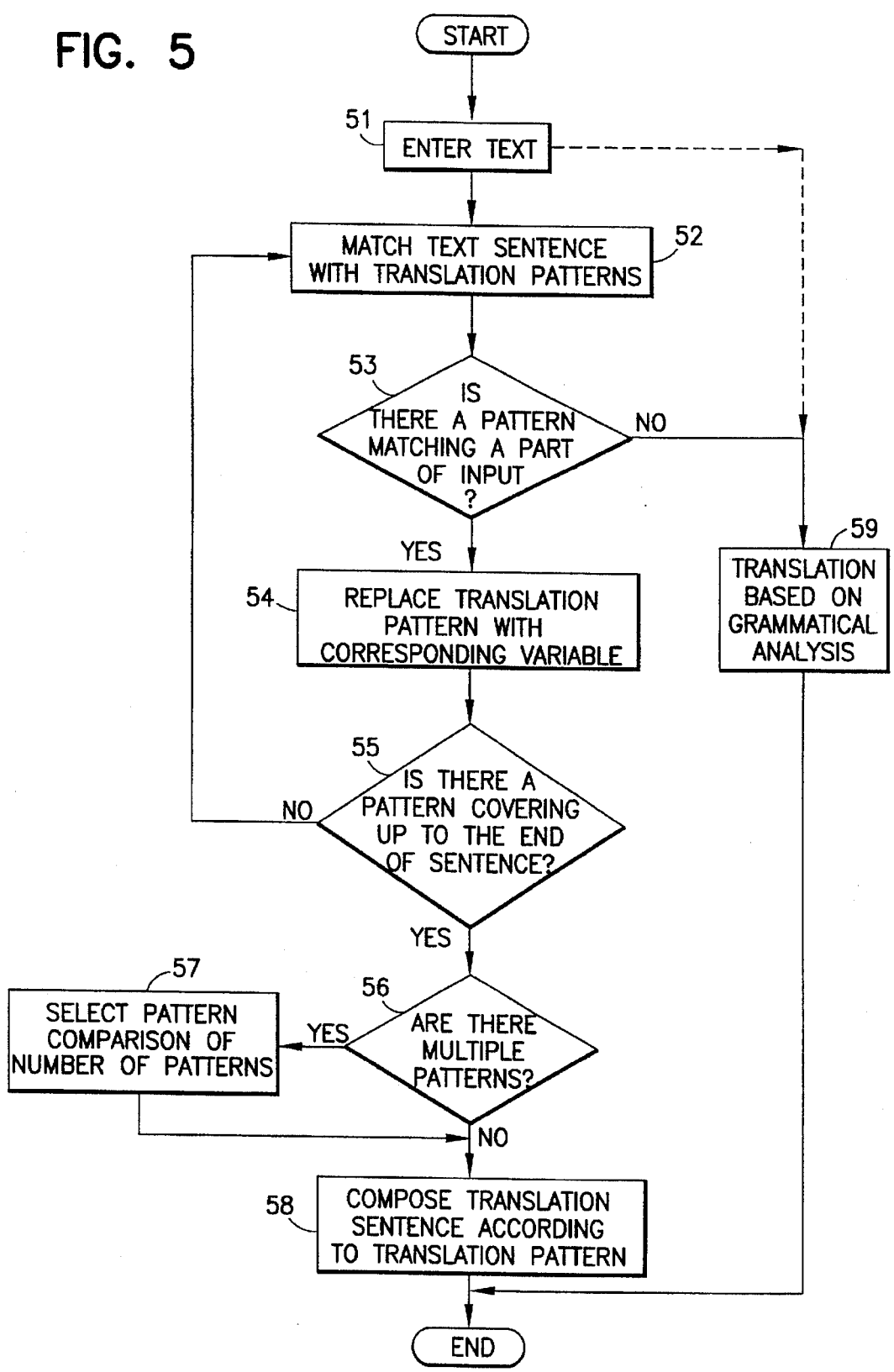
FIG. 5 is a diagram showing an example of an algorithm for the translation processing of this invention.

FIG. 5 is a diagram showing one example of an algorithm for the translation processing according to this invention.

First, enter a text in Japanese (Step 51). This text sentence is matched with the source language patterns in the translation patterns (Step 52). If there is a source language pattern matching a part of the input, that source language pattern is converted to the corresponding variable in the translation pattern (Steps 53 and 54). This processing is repeated until translation patterns covering up to the end of the text sentence are extracted (Step 55). That is, it is examined whether or not there is a translation pattern that can reach the end of the pattern in as many number of steps as the length of the text sentence. If there are multiple extracted translation patterns 56, the pattern that has the minimum number of patterns or nestings is selected 57. Alternately, the user may specify priorities for each pattern in advance for selection.

Finally, an English sentence is composed by converting the extracted source language pattern into a target language pattern according to the translation pattern (Step 58). If there is no source language pattern that matches a part of the entered text sentence in Step 53, the processing is performed by machine translation based on ordinary grammatical analysis (Step 59).

The matching of the text sentence with the translation pattern in Step 52 is performed by checking the entered text sentence character by character from the left. The algorithm of this processing will be explained in the following referring to FIGS. 6 through 8 by exemplifying "接点を 改良す る" an input text sentence.

Figure 7:
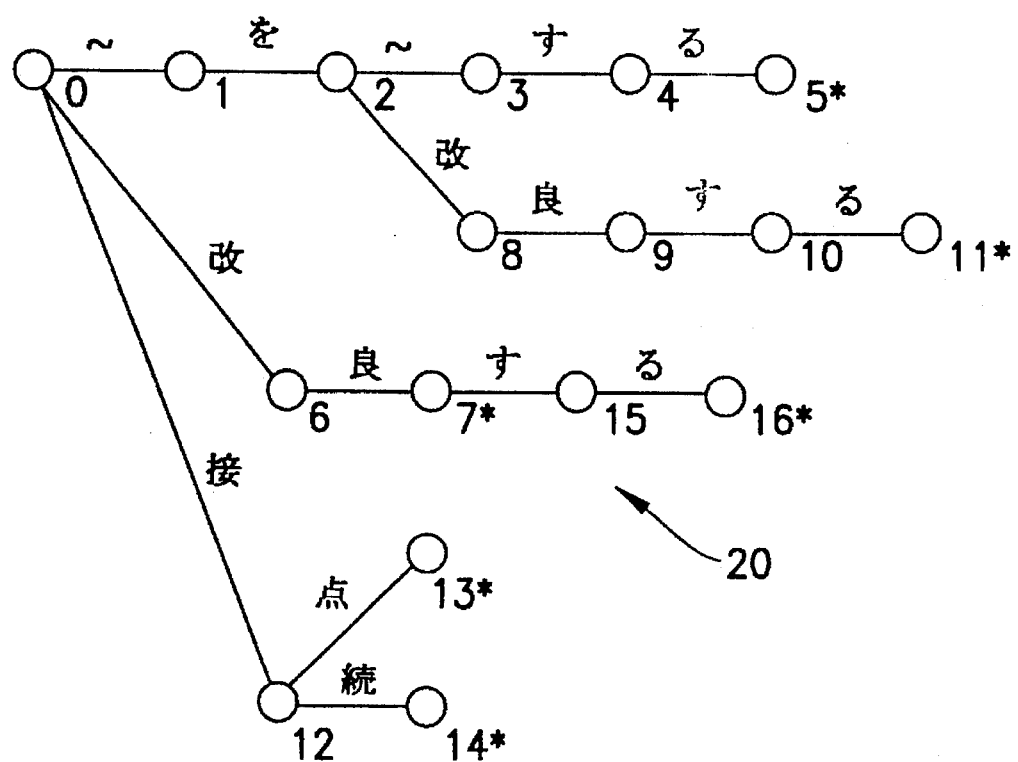
FIG. 7 is a diagram showing a tree structure corresponding to the translation patterns of FIG. 6.

First, FIG. 6 shows those translation patterns that, out of all the translation patterns, relate to this text sentence. FIG. 7 shows the pertinent parts of the index tree of translation patterns as a tree structure 20. In the tree structure, the state just after reading each label of an arc (denoting a character or a variable) corresponds to each node (0–16) just to the right of the arc.

Figure 8:
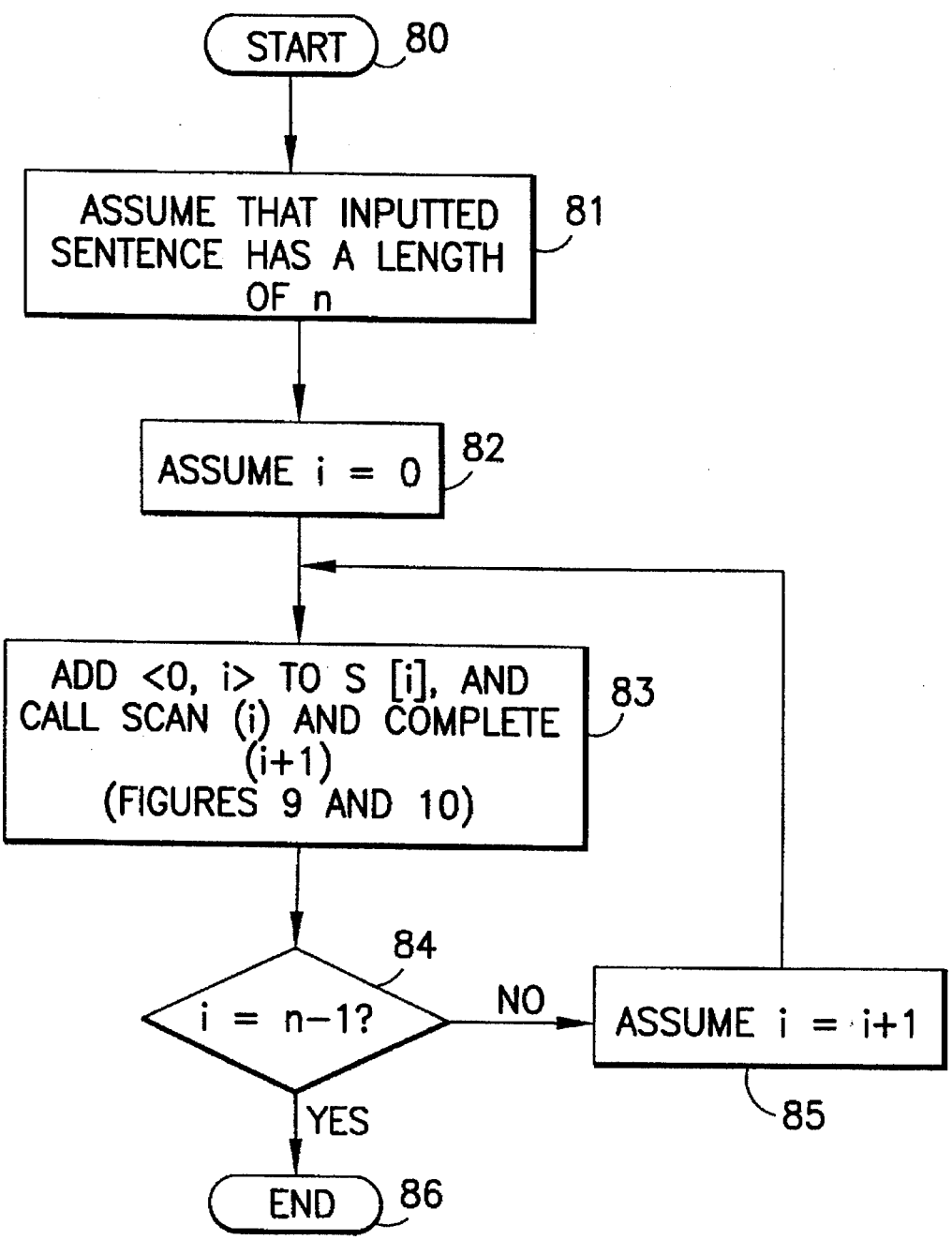
FIG. 8 is a diagram showing an algorithm for matching between a text sentence and translation patterns.

Referring to FIG. 8, first, the length of the sentence is assumed to be n (Step 81). In the example sentence, n=7. A state set s[i] corresponds to each character position i. In the initial state when the analysis of sentence begins, s[0]={<0, 0>} because no matching has been started yet. The analysis is performed by executing the two operations of scan(i) and complete(i) for each character position i=0,1,n (Steps 83–85).

An element of the state set is a pair <p,f> which represents the state where a pattern is matched halfway. p represents a node of the index tree, while f indicates where the matching of that pattern starts in the sentence.

For an inputted character x, a node p' traced from a node p through the index tree is defined as p'=shift(p,x). For example, shift(7, す)=15 in FIG. 7. The operation of tracing the index tree, shift(p,x) can be executed at a high speed by indexing or hashing arcs from each node of the index tree using an array with the size of the entire alphabet set.

Figure 9:
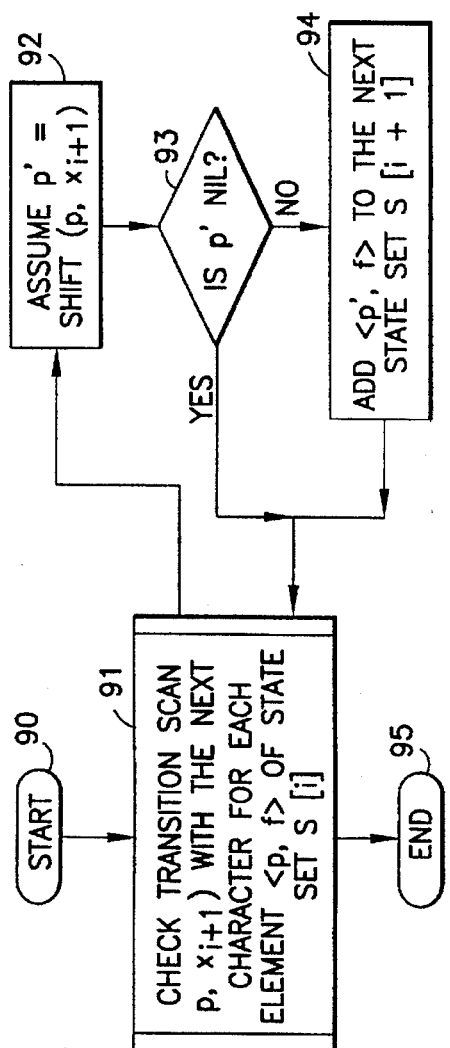
FIG. 9 is a diagram showing details of scan(i) processing of FIG. 8.

FIG. 9 shows the details of processing of scan(i). That is, scan(i) uses shift(p,$x_{i+1}$) to check for each state <p,f> of s(i) whether or not the (i+1)th character, $x_{i+1}$, of the inputted sentence matches the pattern (Steps 91 and 92). If so, <shift(p, $x_{i+1}$), f> is added to the state set s[i+1] for character position i+1 (Steps 93 and 94).

Figure 10:
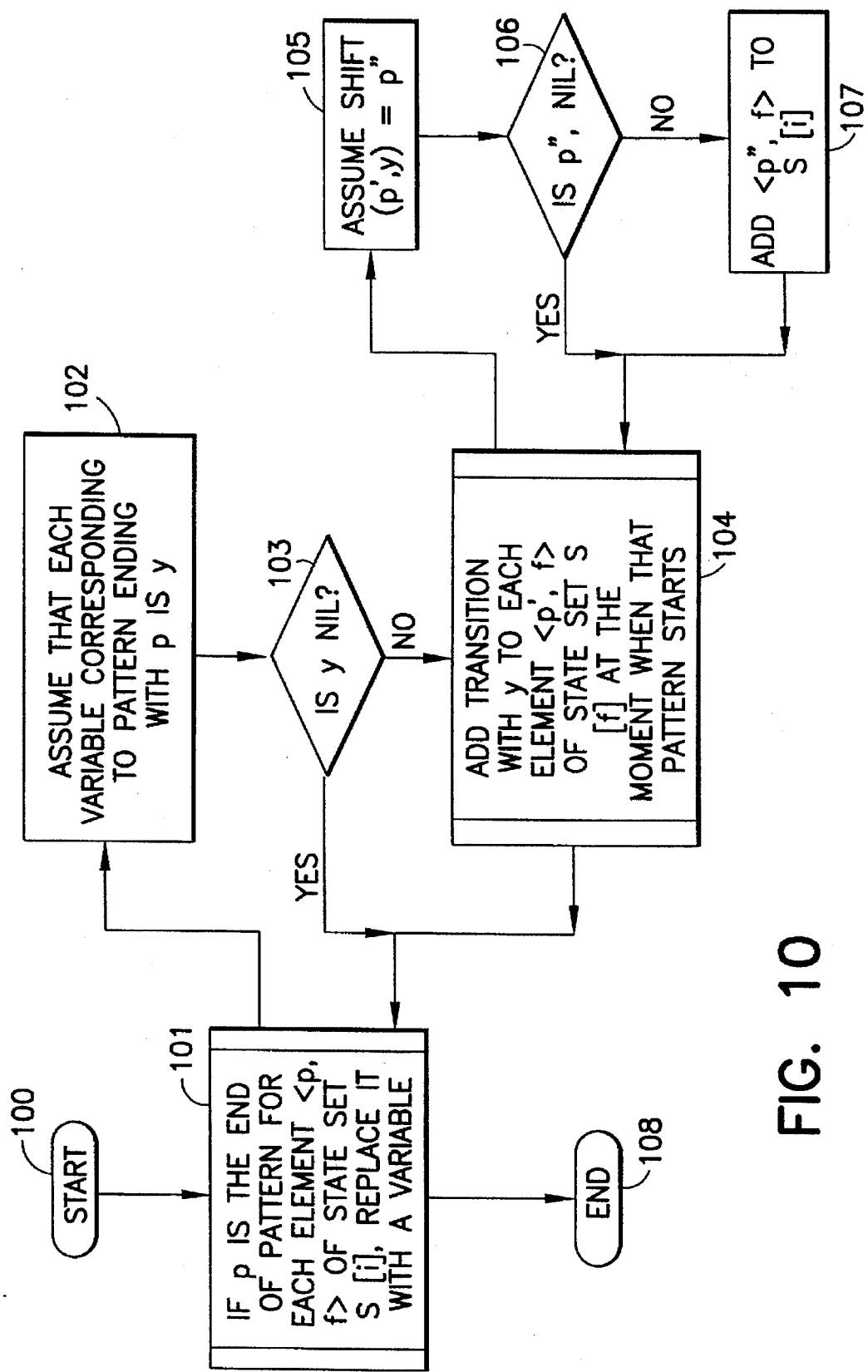
FIG. 10 is a diagram showing details of complete(i) processing of FIG. 8.

FIG. 10 shows the details of processing complete(i). For each state <p,f> of s[i], if p corresponds to the end of a pattern, complete(i) sets the replacement variable of that pattern to y (Steps 101 and 102), and returns to the start position f of that pattern to examine pattern matching with y. That is, shift(p'y) is examined for each element <p',f> of s[f], and, if the matching is successful, <shift(p',y),f> is added to s[i] (Steps 104 and 105).

Figure 11:
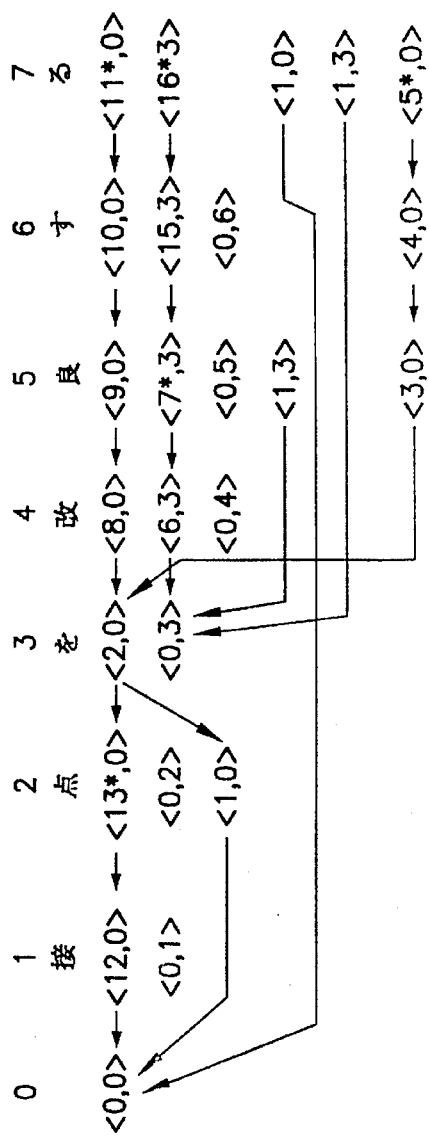
FIG. 11 is a diagram showing an execution result of the algorithm for the translation patterns of FIG. 6.

FIG. 11 shows the execution result of the algorithm for the text algorithm for the text sentence "接点を 改良す る". The figure shows the contents of s[i] for each character position i. At the character position i=1, as the result of scan(i) processing, a partial pattern <12,0> starting at node 0 and ending at node 12, that is, " " is extracted. At the character position i=2, a partial pattern <13,0> starting at node 0 and ending at node 13, that is, "接" is extracted. Because node 13 has a (*) corresponding to the end of a pattern, a partial pattern <1,0>, in which "接点", is replaced with "~" is added to s[2]. At the next character pattern i=3, a partial pattern <2,0> starting at node 0 and ending at node 2, that is, "接点を" is therefore extracted. Then, the pattern matching is repeated to the final character position in a similar manner.

Whether or not the matching is successful depends only on whether or not there is a pattern starting at the beginning of a sentence and ending at the final character position n (n=7 in this case). In this example, <11*,0> and <5*,0> fall into this case. Also, in the figure, how each state is generated by the shift() operation from which state is indicated by an arrow. For example, it is found that the pattern <11*,0> follows a path of nodes 0-12-13-0-1-2-8-9-10-11, while the pattern <5*,0> follows a path of nodes 0-12-13-0-1-2-3-4-5. If this information is retained in the algorithm, it becomes possible after completion of the analysis to check which pattern matches with which part in a sentence. In the case of this example, it is found that two matching results, that is,

接点 を 改良 する

接点 を 改良 する were possible. Here, parts enclosed in the parentheses indicate that they match nested partial patterns.

Generally, there may be multiple results of matching. Although various approaches may be conceivable as to which one of them should be selected, the easiest approach is to put priority on the one using fewer patterns, from the viewpoint that a pattern with a higher degree of matching should be selected. In the above example, as clearly seen in FIG. 6, "接点 を 改良 する" uses the three patterns of (181, 183, 185), while "接点 を 改良 する" uses the two patterns of (182, 185). Thus, a translation sentence "Improve point of contact in productivity" can be obtained.

The pattern collation algorithm of this invention works effectively even for a large amount of patterns, and does not adversely affect the response of the entire systems.

As also shown by the tree structure of FIG. 3, the variable of the source language pattern may be any one character. More accurate matching of patterns becomes possible by distinguishing the variables (date, part number, etc.). For example, when a seven-digit number such as 5576-003 is used as a part number of a product, a pattern which matches with such a part number can be described as shown in FIG. 12. Here, @ is a variable matching with a part number, and # is a variable matching with one numeral.

When this translation pattern is used, it is possible to arrange that a translation pattern such as <Original language pattern, variable, target language pattern>@ 在庫 切れ,~, No stock of $1 matches only a form with a part number such as "5576-003 在庫 切れ", and generates a translation of "No stock of P/N 5576-003. The variable can be treated as one character regardless of its physical size as long as it can be distinguished from other characters. It is possible to create various sentences with high utility by combining this part number pattern with the patterns with a nested structure including sentences or phrases shown in FIG. 2.

It is effective to arrange that the translation based on patterns as disclosed by this invention be used as preprocessing for an existing translation system, and if pattern matching is successful, to employ the translation based on the pattern, and to start the translation system if the pattern matching fails. That is, the translation patterns of this invention are prepared for fields that are difficult to customize in a general translation system, and are used as preprocessing for machine translation. This enables it to quickly deal with special expressions that are hard for the translation system to handle.

It is apparent that the translation based on patterns as disclosed by this invention can be used in a translation system translating English or German into Japanese. Furthermore, it can be used for purposes other than translation between natural languages. As on example of such cases, FIG. 13 shows an example of translation tables used for creating computer commands from natural language-like inputs. The symbol @ represents a name in the alphabet of up to eight digits corresponding to the leading part of a file name. As in the example of FIG. 12, a file name can be described in such a way as "WEIGHT.TXT." Furthermore, it is possible to create a command such as "COPYFILE WEIGHT.TXT TO HEALTH.TXT" from natural language-like inputs by combining it with a pattern with a nested structure.

FIG. 14 shows other translation table. The table of translation patterns can be used to translate some of French conversational expressions into English using the translation apparatus of this invention. Here, %F and %M are feminine and masculine nouns, respectively. %N stands for proper nouns for names.

We claim:

1. An apparatus which translates a written source language pattern of a first language to a target language pattern of another written language, comprising:

a computer with a memory;

a plurality of translation patterns stored in the memory, each of the translation patterns comprising a at least a one source language pattern comprising a string of separate characters with no linguistic notations; at least one variable comprising at least one character that replaces a portion of the at least one source language pattern; and a target language pattern comprising a string of separate characters with no linguistic notations which is a translation sentence corresponding to the at least one source language pattern; wherein the at least one variable is either a singular variable which corresponds to a singular source language pattern, or a plurality of variables which correspond to a plurality of nested source language patterns, wherein each nested source language pattern is a combination of two or more singular source language patterns; and means for comparing a text sentence comprising a string of separate characters with no linguistic notations to one or more of said plurality of nested source language patterns and singular source language pattern to determine if there is a match between the text sentence and the nested source language patterns or the singular source language patterns means responsive to said comparing means to generate a first translational sentence based on the result of a match between the text sentence and the nested or singular source language patterns and means responsive to said comparing means to generate a second grammar based translation when there is no match.

2. The translation apparatus as described in claim 1, where the translation pattern further comprises:

index means, contained in said memory, for representing a hierarchical structure between each nested source language pattern or singular source language pattern.

3. The translation apparatus of claim 2, wherein the index comprises:

tree structure means for extracting one or more common leading strings of the nested source language patterns or singular source language patterns of the translation patterns.

4. The translation apparatus of claim 3 a means for inputting said text sentence comprising a string of separate characters with no linguistic notations into the computer;

and wherein said comparing means performs matching to source language patterns with respect to said text sentence by using said index, the index having a tree structure that is created by extracting common leading base source language patterns of said plurality of nested source language patterns; and wherein translation of said text sentence is based on the result of said matching.

5. An apparatus according to claim 4 wherein said computer memory has stored therein a pattern table that records as entries one or more translation patterns, each translation patterns comprises a base source language pattern; a variable that is identified with a portion of the source language pattern; and a target language pattern which is a translation corresponding to the base source language pattern; said variable is either a singular variable which corresponds to a singular source language pattern, or a nested variable which corresponds to a nested source language pattern, each nested source language pattern is a combination of two or more singular source language patterns, said pattern table further comprises:

a) a data element storing each character of the source language pattern in the memory and, an identifier indicating when a character is positioned at the end of the base source language pattern;

b) one or more nested translation patterns, which are translation patterns with said nested source language pattern being replaced by a variable embedded in the source language pattern of the nested translation pattern; and c) means for performing translation by matching entries of the pattern table with an input text sentence and extracting a matching target language pattern.

6. The translation apparatus of claim 5, wherein if said variable embedded in the source language pattern of the nested translation pattern is a singular variable that corresponds to, and is embedded within a nested variable, the singular and nested variables are made equivalent to represent the correspondence.

7. A translation method for translating a written source language pattern of a first language to a target language pattern of another written language, comprising the steps of:

identifying, in a translation pattern registration and processing section of a data processor, a source language pattern in one or more translation patterns with a variable, the translation patterns also have a target language pattern associated with the source language pattern, said variable is either a singular variable which corresponds to a singular source language pattern, or a nested variable which corresponds to a nested source language pattern, each nested source language pattern is a combination of two or more singular source language patterns;

matching in a comparison circuit means of a data processor, a text sentence to a combination of two or more translational patterns;

extracting, by an extracting circuit means of a data processor, a nested source language pattern from a nested translation pattern which is a translation pattern, the nested translation pattern corresponding to a nesting variable which replaces said variable; and extracting, by an extracting circuit means of a data processor, target language patterns corresponding to the nested variable and the nested source language pattern from the translation pattern, and outputting said target language patterns as a translated sentence.

8. The translation method as described in claim 7, wherein the matching between the text sentence and the translation patterns further comprises the steps of:

matching, with the use of a computer, an input text sentence while scanning the text sentence character by character with an index representing a hierarchical structure of the source language patterns, and using an identifier, within the computer, to indicate that a matching character is at the end of the source language pattern; and converting, by using a data processor converter circuit means, the source language pattern into a predetermined variable to be stored within said computer, said variable is either a singular variable which corresponds to a singular source language pattern, or a nested variable which corresponds to a nested source language pattern, each nested source language pattern is a combination of two or more singular source language patterns.

9. The translation method as described in claim 8, wherein the matching between said text sentence and said translation patterns further comprises the step of:

extracting by the data processor extracting circuit means one matching result from a set of matching results, the extracted result having a minimum number of language patterns.

10. A translation method based on written patterns comprising a pattern translation system that performs matching of an input text sentence with previously prepared written translation patterns, and performs translation based on the result, a machine translation system performs translation based on the result of grammatical analysis in said text sentence, said translation method comprises the steps of:

identifying a source language pattern in one or more translation patterns with a variable, the translation patterns also have a target language pattern associated with the source language pattern, said variable is either a singular variable which corresponds to a singular source language pattern, or a nested variable which corresponds to a nested source language pattern, each nested source language pattern is a combination of two or more singular source language patterns; and performing pattern matching within a computer, by matching by using a combination of a source language patterns, a variable, and a target language pattern, and an index of a tree structure relating to source language patterns in the translation patterns; said variable is either a singular variable which corresponds to a singular source language pattern, or a nested variable which corresponds to a nested source language pattern, each nested source language pattern is a combination of two or more singular source language patterns;

extracting a nested source language pattern from a nested translation pattern which is a translation pattern, the nested translation pattern corresponding to a nesting variable which replaces said variable; and extracting target language patterns corresponding to the nested variable and the nested source language pattern from the translation pattern;

translating the text sentence based on the translation pattern when extraction of the translation pattern with said matching is successful; and translating the text sentence with said machine translation system when the matching fails.

* * * * *